United States Patent [19]
Lohn

[11] Patent Number: 4,633,911
[45] Date of Patent: Jan. 6, 1987

[54] ORIFICE PLATE SEAL

[75] Inventor: Paul Lohn, Houston, Tex.

[73] Assignee: Control Specialties Co., Inc., Houston, Tex.

[21] Appl. No.: 692,428

[22] Filed: Jan. 18, 1985

[51] Int. Cl.⁴ .............................................. F15D 1/02
[52] U.S. Cl. .................................. 138/44; 277/206 R
[58] Field of Search .......................... 138/44; 251/326; 277/206 R, 214

[56]  References Cited
U.S. PATENT DOCUMENTS

| | | | |
|---|---|---|---|
| 1,704,003 | 3/1929 | Johnson | 277/206 R X |
| 1,731,404 | 10/1929 | Wetherill | 138/44 |
| 2,324,688 | 7/1943 | Finlayson et al. | 277/206 R X |
| 2,366,161 | 1/1945 | Tweedale | 277/206 R |
| 3,126,917 | 3/1964 | Hodgeman et al. | 138/44 |

Primary Examiner—Stephen Marcus
Assistant Examiner—Mark Thronson
Attorney, Agent, or Firm—James E. Bradley

[57] ABSTRACT

An orifice seal is shown of the type adapted to be inserted into an orifice meter tube for determining fluid velocity within the tube. The orifice seal includes a resilient seal ring which is adapted to be received about a circumferential region of the orifice plate. The seal ring has circumferential grooves formed on either side of an orifice plate channel. The grooves are formed between inner and outer resilient lips of the seal ring. The inner lips of each of the circumferential grooves is arranged to overlie the circumferential region of the orifice plate when the plate is in place to retain the orifice plate within the seal ring. A U-cup spring located within each of the circumferential grooves resists the deformation of the groove lips by pressure acting on the orifice plate to prevent cold flow of the seal material.

2 Claims, 5 Drawing Figures

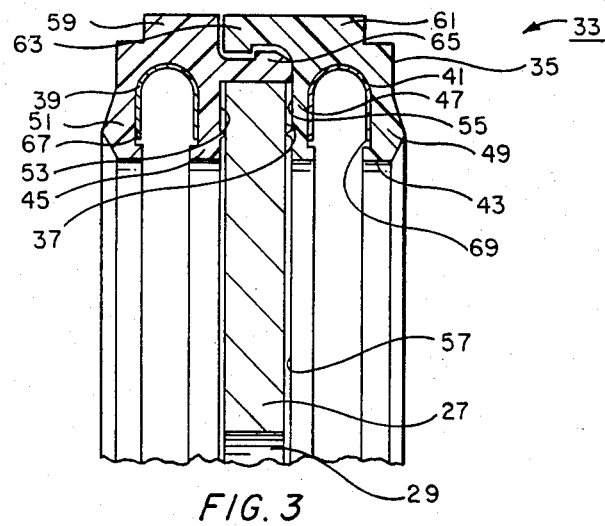
FIG. 3
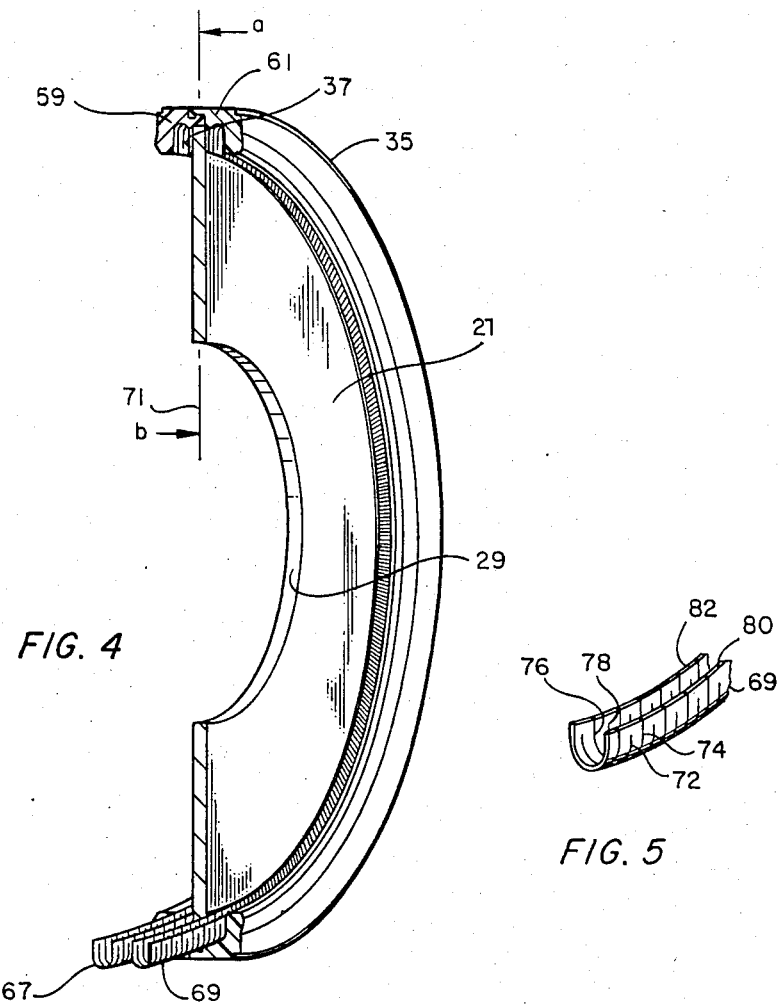
FIG. 4
FIG. 5

ORIFICE PLATE SEAL

BACKGROUND OF THE INVENTION

1. Field of the Invention

The present invention relates to an orifice plate of the type designed to be inserted into an orifice meter tube for determining fluid velocity and, specifically, to an orifice plate seal having a spring loading mechanism to prevent cold flow of the seal material when subjected to pressure within the metering tube.

2. Description of the Prior Art

Metering tubes are commercially available for insertion into pipelines used for custody transfer of gaseous fluids. For instance, a "FLANGE NECK SUPERIOR METER TUBE" is available in 150 to 2,500 pound pressure ratings from Control Specialties, Inc., of Houston, Tex. Such metering tubes are typically provided with either a single or a dual-chamber, flange-neck type orifice fitting. The "orifice fitting" is the portion of the metering tube which holds the orifice plate. The dual chamber orifice fitting design allows orifice plates to be installed and removed conveniently in a pressurized line. The dual-chamber orifice fitting is composed of two independent compartments separated by a stainless steel slide valve. A shaft pinion assembly, included on the orifice fitting, allows the slide valve to be opened and closed for insertion and removal of the orifice plate.

The orifice plate is typically made of stainless steel and contains an orifice which is usually located in the center of the plate. When the plate is installed within the orifice fitting, it is aligned within the metering tube perpendicular to the flow of fluid therein. By measuring the pressure drop across the plate, the fluid velocity can be calculated.

Orifice plates, of the type under consideration, utilize a face seal of a resilient material which is received about a circumferential region of the orifice plate. In the past, synthetic rubbers, elastomers, fluropolymers, and high temperature metal seal rings have been utilized for the orifice plates depending upon the characteristics of the fluid being transferred. Metal seal materials sometimes leaked, resulting in inaccuracies in the fluid velocity measurement. Certain gaseous fluids, such as ethylene and carbon dioxide, caused the elastomeric seal materials to swell, thereby destroying the integrity of the seal. Fluropolymer materials were available which were resilient to swell in the fluids being transferred, but such materials lacked the "memory" of a traditional elastomer, and exhibited "cold flow" of the sealing material in some situations.

A need exists, therefore, for a seal for an orifice plate which is resistant to swell during the transfer of difficult gaseous fluids, such as ethylene and carbon dioxide.

A need exists for such an orifice seal which is energized to prevent cold flow of the sealing material and provide a seal memory similar to that of a traditional elastomer.

SUMMARY OF THE INVENTION

The orifice seal of the invention is intended for use with an orifice plate of the type designed to be inserted into an orifice meter tube for determining fluid velocity within the tube. The orifice seal includes a resilient seal ring formed from a material which resists swell in the fluid within the meter tube. The seal ring is adapted to be received about a circumferential region of the orifice plate. The seal ring has inner and outer circumferential grooves formed in an interior region of the seal ring on either side of an orifice plate channel. The grooves are formed between inner and outer resilient lips of the seal ring with the inner lips of each of the circumferential grooves being arranged to overlie the circumferential region of the orifice plate to retain the orifice plate within the seal ring.

A spring loading means is provided within each of the circumferential grooves for resisting the deformation of the groove lips. Preferably the spring loading means is a U-cup spring received within each of the seal ring circumferential grooves.

Additional objects, features and advantages will be apparent in the written description which follows.

BRIEF DESCRIPTION OF THE DRAWINGS

FIG. 3 is a partial, cross-sectional view of the orifice plate and seal taken along the lines III—III in FIG. 2.

FIG. 4 is a partial, cut-away view of the orifice seal of the invention in place on an orifice plate.

FIG. 5 is a partial, isolated view of the spring loading mechanism of the invention.

DETAILED DESCRIPTION OF THE INVENTION

Figure 1:
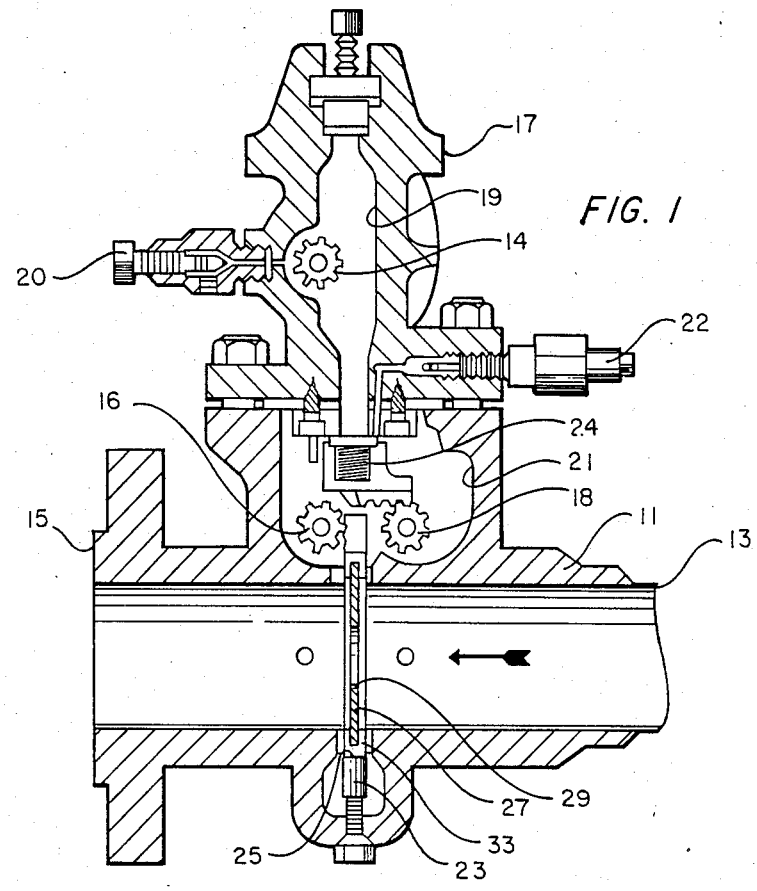
FIG. 1 is a partial side, cross-sectional view of the orifice fitting of a meter tube of the type used with the orifice plate of the invention.

FIG. 1 shows a portion of an orifice meter tube, designated generally as 11, which is connected at either end 13, 15, thereof within a fluid transfer pipeline. The pipeline could be used, for instance, to transfer natural gas, carbon dioxide, ethylene, or the like. The meter tube 11 includes an orifice fitting 17 which can comprise an upper chamber 19 and a lower chamber 21, in the case of a dual chamber fitting. The orifice fitting 17 is designed to provide a convenient means for the insertion, removal and positioning of a plate carrier.

Figure 2:
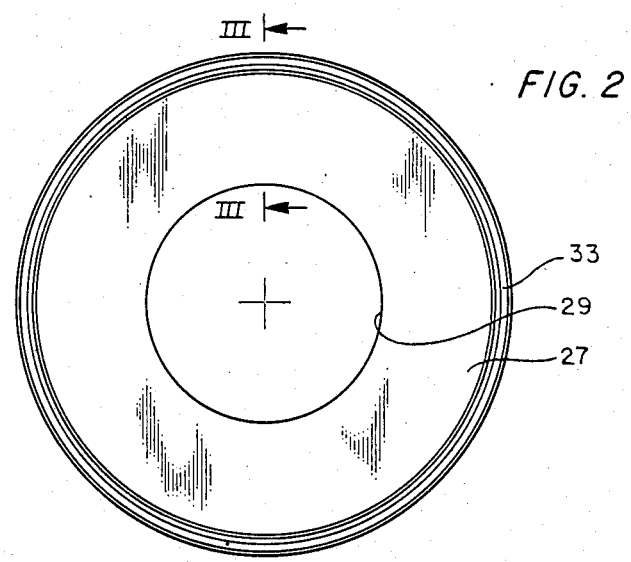
FIG. 2 is a side, perspective view of an orifice plate having the orifice seal of the invention.

The plate carrier 23 is a generally square, planar member and has a central opening 25 for receiving an orifice plate and seal (27, 33 respectively in FIG. 2). The orifice plate 27 is typically machined from stainless steel and has an outer diameter which can range from about 1 inch to upwards of 45 inches, depending upon the application. Typical plate thicknesses range from about ⅛ inch to ¾ inch. These dimensions can vary and are merely typical dimensions given for purposes of illustration. The orifice plate has an orifice 29, usually centrally located within the orifice plate 27. However, the orifice 29 can be eccentrically located and can be beveled, counterbored, and the like.

As shown in FIG. 1, the plate carrier 23 is inserted into the orifice fitting 17 through the upper chamber 19 and past a slide valve 24 into the lower chamber 21, whereby the plate carrier 23 and orifice plate 27 are arranged perpendicular to the flow of fluids passing through the tube 11. The plate carrier 23 is inserted by means of shaft pinion assemblies 14, 16, 18. Although certain other features of the orifice fitting 17 are shown for purposes of illustration such as bleeder valves 20 and equalizer valve 22, these do not form a part of the present invention. Orifice fittings of the type shown are commercially available from Control Specialties, Inc., of Houston, Tex.

The orifice seal seals off the flow of fluid about the periphery of the orifice plate 27 so that fluid within the tube 11 is forced through the orifice 29. The resulting pressure drop which occurs across the orifice plate 27 can be measured by associated equipment on the tube 11 so that the velocity of the fluid within the tube 11 can be calculated.

The orifice seal 33 is illustrated in greater detail in FIG.'S 3 and 4. The orifice seal 33 includes a resilient seal ring 35 which is adapted to be received about a circumferential region 37 of the orifice plate 27. Where difficult fluids such as ethylene and carbon dioxide are being transferred, the seal ring 35 is preferably formed from a polyester elastomer which is resistant to swell and degradation in the fluid being transferred. A preferred material is a block co-polymer of short-chain diol terephthalate and long-chain polyether diol terephthalate sold under the trademark "HYTREL" by the DuPont Company, Elastomer Chemicals Department, Wilmington, Del. The characteristics of the "HYDREL" polyester elastomer are described in detail in the DuPont product bulletin HYT-504A. Although this polyester elastomer is preferred for the transfer of carbon dioxide and ethylene, different fluids could require the selection of a different resilient material in order to resist swell in those materials.

As shown in FIG. 3, the seal ring 35 has a pair of circumferential grooves 39, 41 formed in an interior region 43 of the seal ring 35. The grooves 39, 41 are formed between inner and outer resilient lips 45, 47 and 49, 51, respectively. As shown in FIG. 3, the inner resilient lips 45, 47 of the seal ring 35 form the sidewalls 53, 55 of an orifice plate channel 57. The inner resilient lips 45, 47 are arranged to overlie the circumferential region 37 of the orifice plate 27 when the plate 27 is in place to retain the orifice plate within the seal ring.

Although the seal ring could be molded as a single unit, the embodiment shown includes a left jacket 59 and a right jacket 61 which have mating edges 63, 65, respectively. A spring loading means, in this case U-cup springs 67, 69 are received within each of the seal ring circumferential grooves 39, 41 for resisting the deformation of the plate channel sidewalls in a direction perpendicular to the plane of the seal ring. The plane of the seal ring is illustrated by the dotted line 71 in FIG. 4 and the forces acting upon the orifice plate are as shown by either "a" or "b" in FIG. 4.

As shown in FIG. 4, each of the U-cup springs 67, 69 is formed as an arcuate, circular chain. Each arcuate chain 69 has alternating slits or cuts 72, 74, 76, 78 which alternately run the complete depth of the lips 80, 82 of the chain. Thus, slit 72 runs partly to lip 80 but completely to lip 82. Similarly, slit 74 runs completely to lip 80, but only partly to lip 82, etc. When springs 67, 69 are in place within grooves 39, 41, the inner lips 45, 47 can flex with plate 27 but have a "memory" to return to their original positions as the force acting on the plate 27 is decreased.

An invention has been provided with several advantages. The orifice seal of the invention can be provided from a material which is resistant to swell by the fluid being transferred within the fluid pipeline. The orifice seal also has a unique spring loading mechanism specially designed to prevent cold flow of the sealing material in carbon dioxide, ethylene and other deleterious fluids. Seal life and integrity are improved, thereby improving the accuracy of the fluid velocity measurement being made.

While the invention has been shown in only one of its forms, it is not thus limited but is susceptible to various changes and modifications without departing from the spirit thereof.

I claim:

1. An orifice plate assembly containing a generally planar orifice plate of the type designed to be inserted into a plate carrier within an orifice meter tube for determining fluid velocity within the tube, comprising:
   a resilient seal ring formed from an elastomeric material which resists swell in the fluid within the meter tube, said seal ring having an interior region adapted to be received about a circumferential region of said orifice plate, said seal ring having a pair of circumferential grooves formed in said ring interior region, each of said circumferential grooves defining an inner and outer resilient lip on said seal ring interior region, said inner resilient lips of said circumferential grooves being arranged to overlie the circumferential region of said orifice plate and form a central, orifice plate channel to retain said orifice plate within said seal ring; and
   a spring within each of said circumferential grooves for resisting the deformation of said groove inner lips in a direction perpendicular to the plane of said orifice plate as fluid passes through said meter tube and acts upon said orifice plate.

2. The orifice plate assembly of claim 1, wherein said spring is a U-cup spring received within each of said seal ring circumferential grooves.

* * * * *